United States Patent [19]

Lee

[11] Patent Number: 4,909,893

[45] Date of Patent: Mar. 20, 1990

[54] PERFORATOR

[76] Inventor: Chin-Piao Lee, No. 2, Lane 491, Chong-Cheng S. Road, Yung-Kang Shiang, Tainan Hsien, Taiwan

[21] Appl. No.: 283,864

[22] Filed: Dec. 13, 1988

[51] Int. Cl.[4] .................................... B32B 31/18

[52] U.S. Cl. .................................... 156/513; 83/821; 156/261; 156/514; 156/518

[58] Field of Search ............... 156/261, 513, 514, 518; 83/618, 621

[56] References Cited

U.S. PATENT DOCUMENTS

| | | | |
|---|---|---|---|
| 2,474,344 | 6/1949 | Carpenter | 83/618 |
| 2,647,578 | 8/1953 | Connor et al. | 83/621 |
| 3,392,077 | 7/1968 | Brieske et al. | 156/513 |
| 3,441,462 | 4/1969 | Bogen et al. | 156/513 |

FOREIGN PATENT DOCUMENTS

| | | | |
|---|---|---|---|
| 1248567 | 11/1960 | France | 156/514 |

*Primary Examiner*—Hien H. Phan
*Attorney, Agent, or Firm*—Bacon & Thomas

[57] ABSTRACT

This invention relates to a perforator for paper perforations, more particularly to a perforator with accessories for feeding adhesive strip to be cut and pushed to attach on a paper to be perforated, and the paper together with the attachments are further perforated so that a perforated paper with reinforcing attachments can be obtained.

2 Claims, 6 Drawing Sheets

PERFORATOR

BACKGROUND OF THE INVENTION

This invention relates to a perforator for paper perforations, and in particular concerns new and useful improvements on a perforator.

The known perforator can only punch hole(s) in margin of paper so that sheets of perforated paper can be filed in order. It is found disadvantegous that the perforated margin of the filed document is offenly torn off after turned from time to time. To this end, the invention has attempted to make an improved perforator to overcome the drawbacks of a known perforator.

SUMMARY OF THE INVENTION

An object of this invention is to provide a perforator which can diminish the disadvantages of a known perforator.

It is another object of this invention to provide a perforator with a construction to provide extra reinforcing attachments around the respective perforations in one punching.

BRIEF DESCRIPTION OF THE DRAWINGS

The present preferred exemplary embodiment will be described in detail with respect to the following drawings, wherein.

DETAIL DESCRIPTION OF THE PREFERRED EMBODIMENT

The following is a detailed description of the best presently contemplated embodiment of the invention. This description is not to be taken in a limiting sense, but is made merely for the purpose of illustrating the general principles of the invention.

Figure 1:
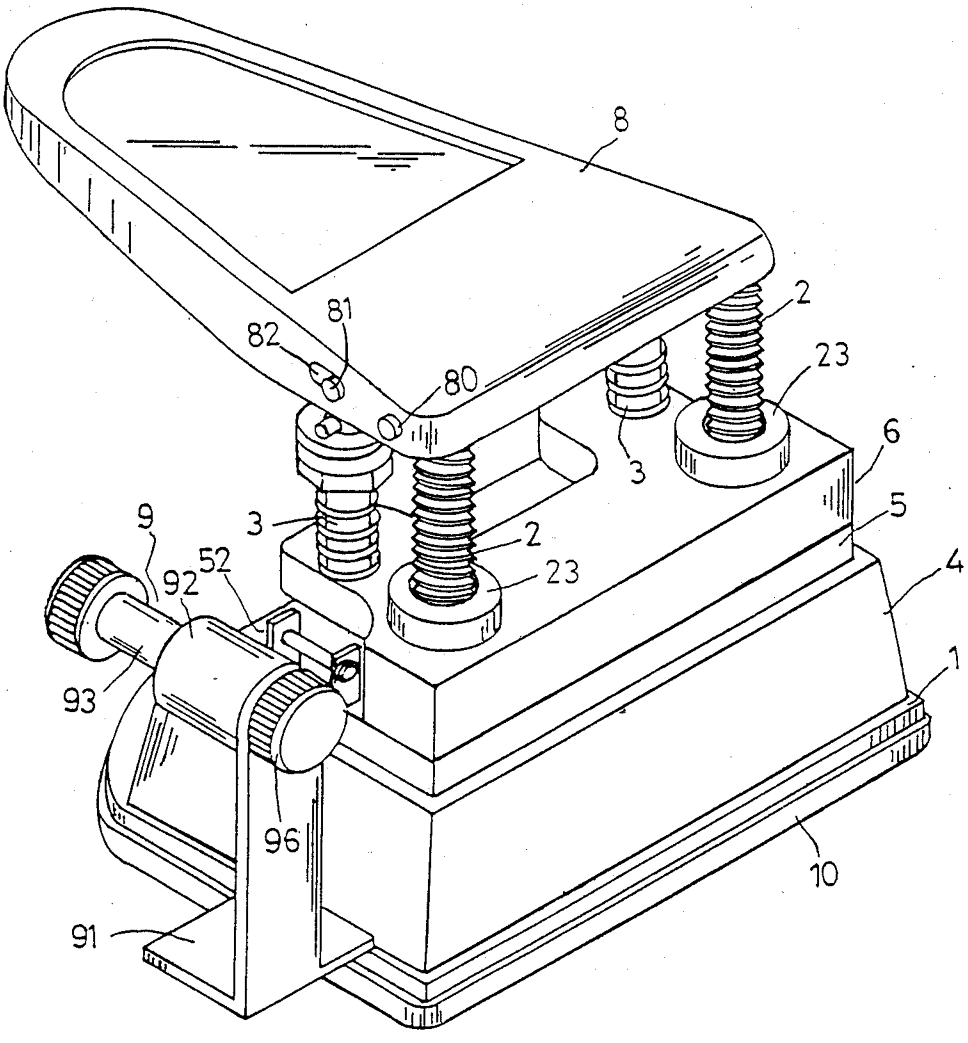
FIG. 1 is a perspective view showing a preferred embodiment of a perforator according to this invention.
Figure 2:
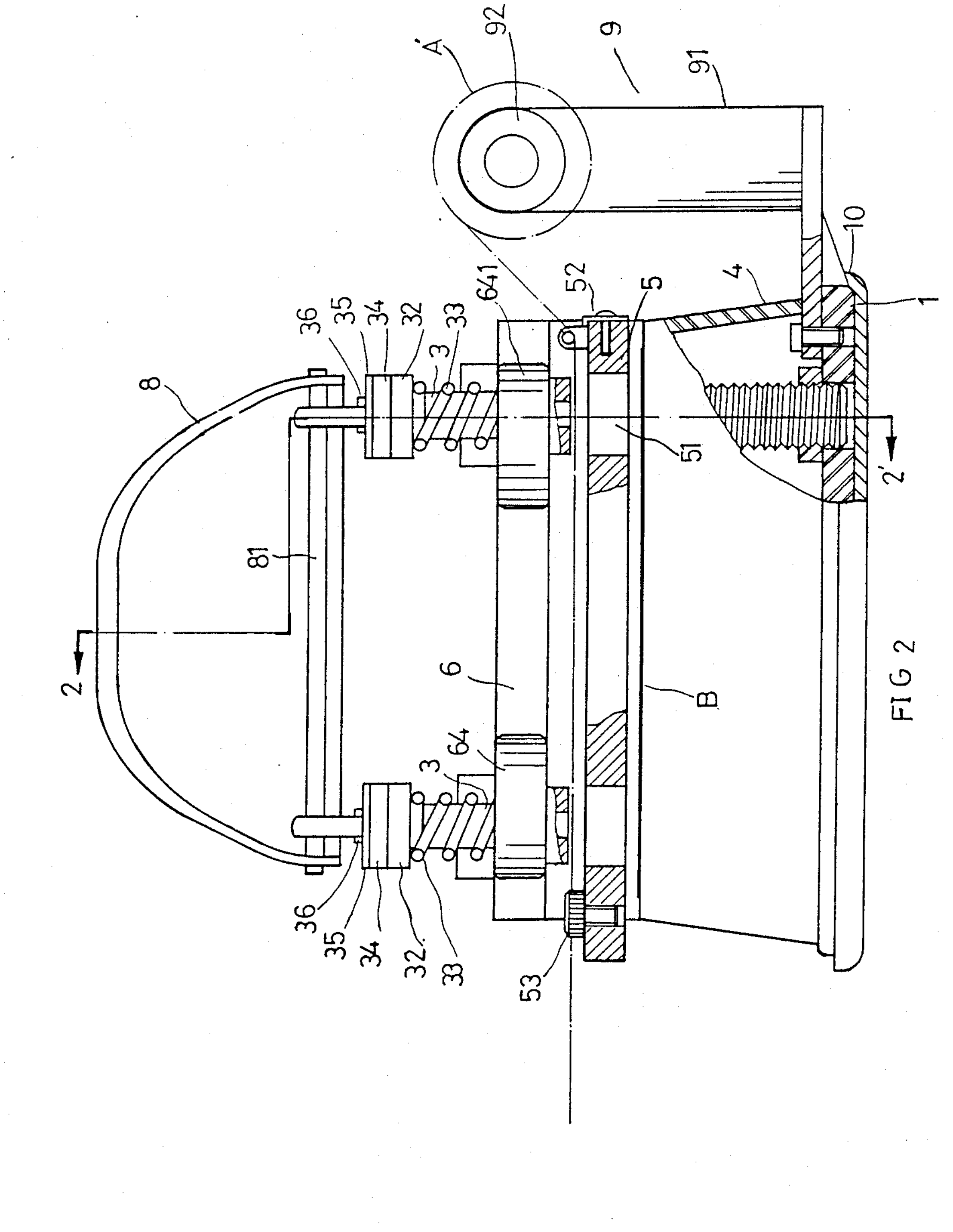
FIG. 2 is a partial cross-sectional view of a rear elevation of the perforator shown in FIG. 1.
Figure 3:
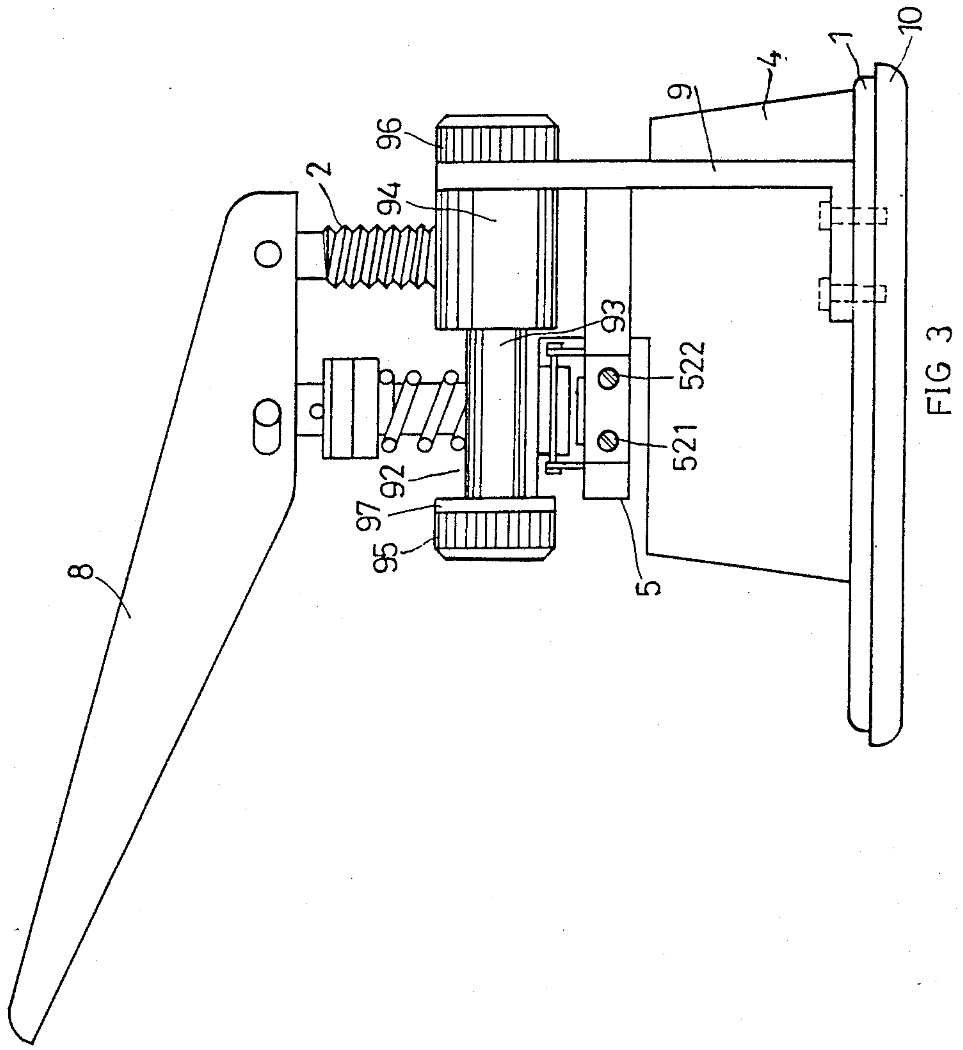
FIG. 3 is a side view of the peforator shown in FIG. 1.

Referring to FIGS. 1, 2 and 3, a perforator comprises a base plate 1, a plastic support 10 secured under the base plate 1, a box 4 mounted on the base plate 1, a die plank 5 and an upper base plate 6 sequentially mounted on the box 4, a pair of spaced column means 2 protruded upwardly from a rear portion of the upper base plate 6 and secured in positions with nuts 23, a pair of cutter means 3 protruded upwardly from a front portion of the upper base plate 6, a pair of spiral springs 33 sleeved around the cutter means 3 and retained between the top surface of the upper base plate 6 and washer means, each of which containing two washers 32, 35 and a sandwiched gasket 34, retained on the upper portions of the cutter means 3 by means of pins 36 transversely inserted by force through the bodies of the cutter means 3 and against the top surfaces of the washer means, a press handle 6 having a downward curved margin around the edge of which a rear portion is mounted pivotally to upper end portions of the columns 2 and cutter means 3 by means of a first pin 80 and a second pin 81 extending substantially horizontally and transversely with two ends of the first pin 80 laterally inserted by force into aligned holes in the columns 2 and the press handle 8 whilst two ends of the second pin 81 laterally inserted by force into aligned holes in the cutter means 3 and slots 82 in the press handle 8, a strip feeder 9 including a bracket 91 secured on a side wall of the box 4 or base plate 1 and a feeder 92 fitted in the upper portion of the bracket 91 by a threaded nut 96, and a strip guider 52 mounted closer to the strip feeder 9 and secured on a side wall of the die plank 5 with screws 521, 522.

Figure 5:
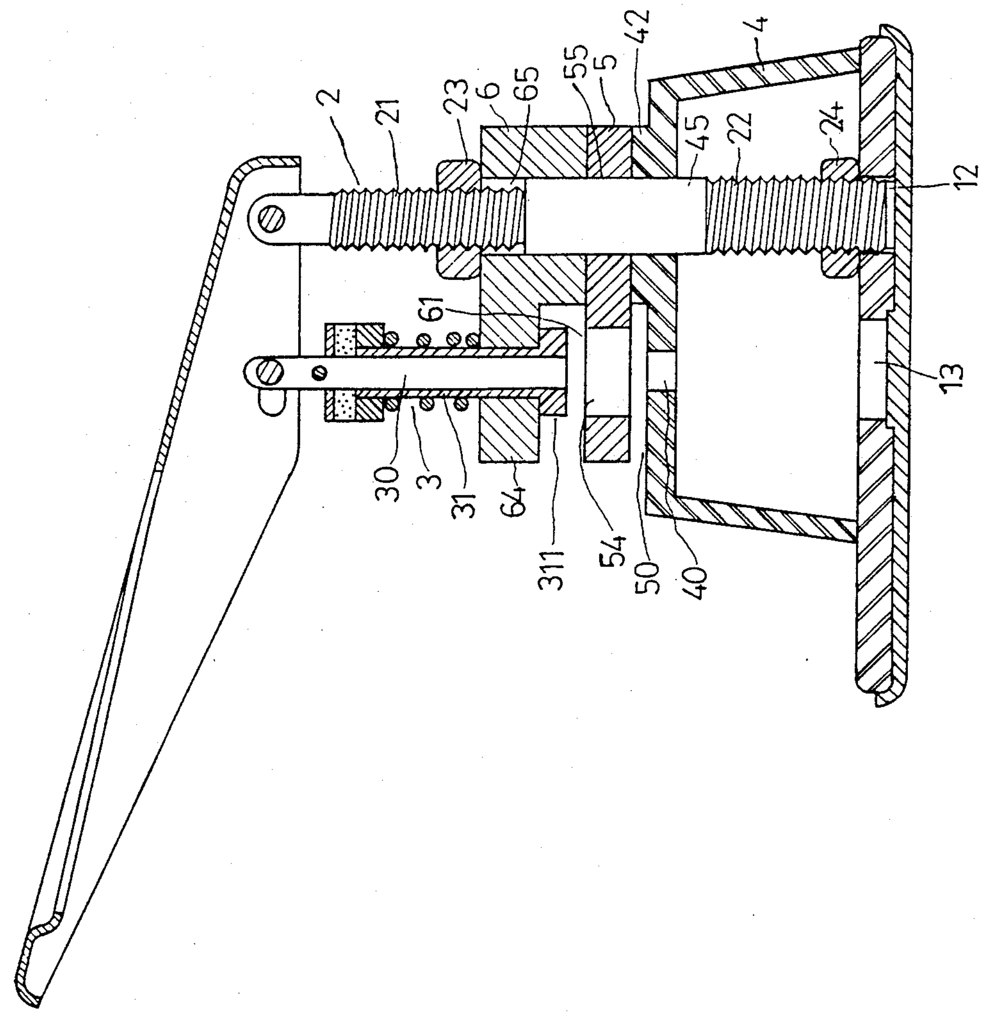
FIG. 5 is a cross-sectional view along line 2—2 shown in FIG. 2.

As shown in FIG. 5, the box 4 has a projection body 42 slightly jutted upwardly and integrally formed on a rear half portion and a perforation 40 in a front half portion of a top wall thereof. Said die plank 5 is mounted on the projection body 42 to form a stock chamber 50 at the front side.

The upper base plate 6 mounted on the die plank 5 has a guide body 64 integrally extending horizontally and forwardly to form a strip passage 61, with a vertical guide hole allowing slides of the insrted cutter 3. Said cutter 3 comprises a tubular body 31 having a sharp edged punch 311 attached to or integrally formed on the lower end and a cylindrical punch rod 30 having a lower portion slidably inserted in a hollow space of the tubular body 31 and vertically located in alignment with the perforation 40.

An opening 54 with an inner periphery corresponding to the external periphery of the punch 311 is provided in the guide body 51 in alignment with the punch 311.

A series of vertical perforations 65, 55 and 45 allow a slidable insertion of the column 2 which has an externally threaded upper portion 21 and lower portion 22 further inserted into a vertical hole 12 formed in the base plate 1 and in alignment with said serial perforations. The columns 2 is secured in place of proper height by nuts 23, 24 firmly threaded on the respective upper portion 21 and the lower portion 22 thereof. It can be seen that the position in height of the column 2 can be adjusted by adjustng the nuts 23, 24. Said base plate 1 further comprises a scrap outlet 13, which is normally closed by the secured plastic support 10, for cleaning out scraps collected in the box 4.

It is to be noted that the construction of this half is the same as that of the other half.

Figure 4:
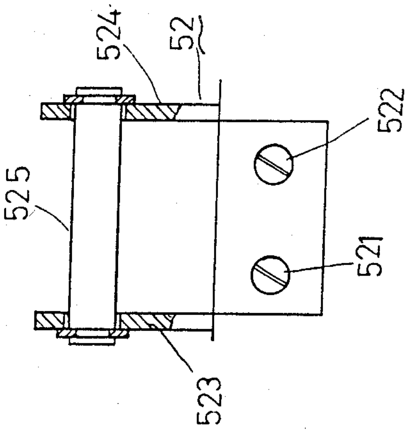
FIG. 4 is a detail of a strip guider mounted on the perforator.

As shown in FIGS. 2, 3 and 4, a shaft 93 of the feeder 92, the strip guide 52 and a holder 53 opposed to the strip guider 42 are arranged in alignment, wherein the feeder 92 further comprises a cylindrical body 94 and an end nut 95 with adjacent washer 97, located on the two ends of the support shaft 93. A strip coil A' can be sleeved around the shaft 93 by disconnecting the end nut 95 and the washer 97, and retained in a rotatable position by replacing the washer 97 and the end nut 95. The strip guide 52, as shown in FIG. 4, comprises a guide shaft 525 rotatably mounted on two spaced support units 523, 524.

Figure 6:
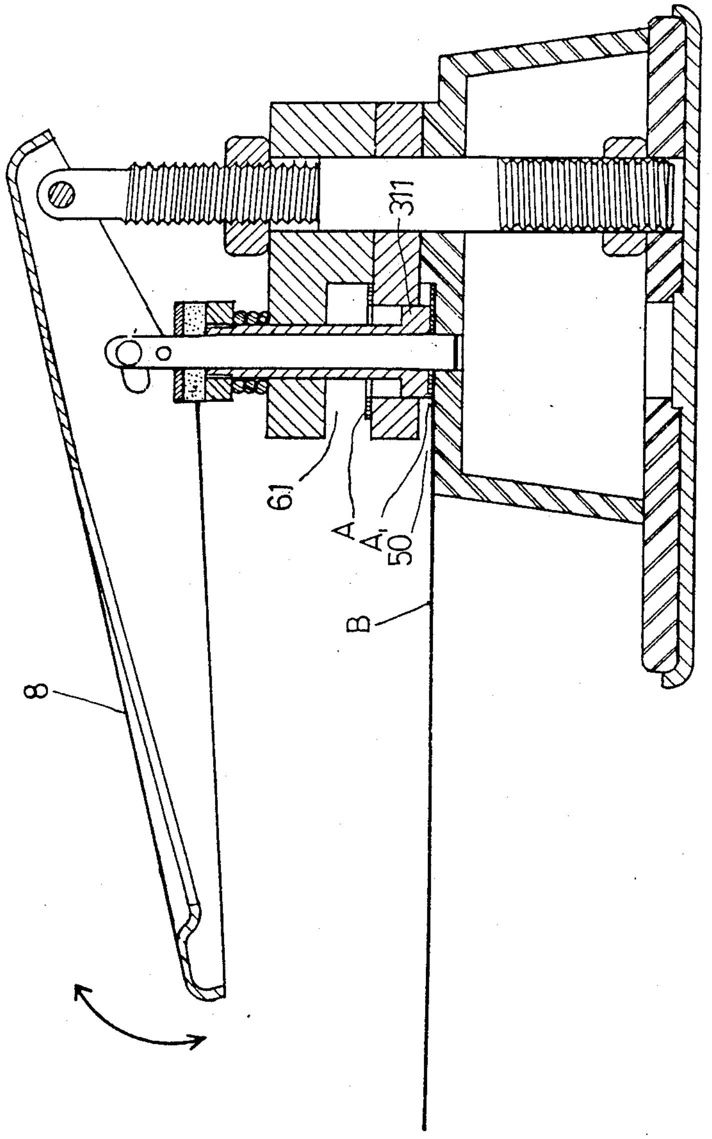
FIG. 6 is a cross-sectional view of the perforator which is operated to punch.
Figure 7:
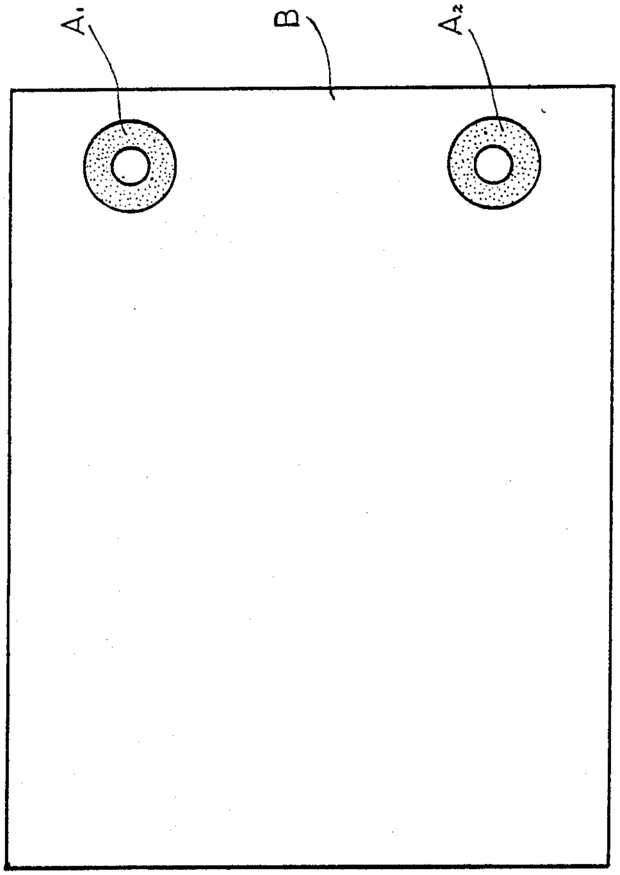
FIG. 7 is a plan view of a paper after completion of punching by the perforator of this invention.

In operation, as shown in FIG. 6, the leading margin of the strip A can be drawn across the strip passage 61 through the strip guide 52 to the holder 53, then stock margin of the paper to be perforated into the stock chamber 50. As the press handle 8 is pressed with hand, the cutter means 3 are pressed simultaneously to blank two pieces of adhesive strip A1 by the punch 311 and pushed down to be attached on stocked paper B, and the punch rod 30 can further be pressed to protrude from the tubular body 31 and punched the blanked strips and the paper. Scraps can be collected in the box 4 and cleaned out through the scrap outlet when necessary. A perforated paper B with reinforcing attachments A1, A2 as shown in FIG. 7 can thus be obtained.

While the invention has been described with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims, which scope is to be accorded the broadest interpretation so as to encompass all such modifications and equivalent structure.

What is claimed is:

1. A perforator comprising:

a base plate having a scrap outlet and two spaced holes;

a box mounted on said base plate, having a projection body with two spaced holes aligned with said two spaced holes in the base plate, formed on a rear half portion and two spaced perforations formed in a front half of a top wall;

a die plank mounted on the projection body of the box to form a stock chamber between the die plank and the box, having two spaced holes aligned with said two spaced holes in the projection body of the box and two spaced openings communicating the stock chamber;

an upper base plate mounted on the die plank, having two spaced holes aligned with said two spaced holes in the die plank and two spaced guide bodies with holes integrally extending horizontally and forwardly to form a strip passage between the guide bodies and the die plank;

two columns with lower portions slidably inserted into the aligned holes in the base plate, the box, the die plank and the upper base plate, each having an extending threaded upper portion and lower portion threaded with nuts for securing the column in position;

two cutter means each of which including a tubular body having a punch aligned with the opening in the die plank, attached to a lower end thereof and slidably inserted through respective hole in the guide body of the upper base plate, and a punch rod slidably inserted in a hollow space of the tubular body and vertically located in alignment with the perforation of the box; two spiral springs sleeved around the cutter means and retained between an upper surface of the upper base plate and two washer means secured on an upper portion of the cutter means;

a press handle pivoted to top end portions of the columns and the cutter means with pins;

a strip feeder having a bracket secured on one side of the box and a feeder for fitting a strip coil;

a strip guide secured on the upper base plate for guiding the strip of the strip coil; and a holder opposed to the strip guide for holding the feeding margin of the strip.

2. A perforator as claimed in claim 1, wherein an external periphery of the punch of the cutter means is in correspondence with an inner periphery of the opening in the die plank.

* * * * *